Patented Feb. 17, 1953

2,628,988

UNITED STATES PATENT OFFICE 2,628,988

1,1,3-TRICHLORO-3,3-DIFLUOROPROPENE

Robert P. Ruh, Midland, Mich., assignor to The Dow Chemical Company, Midland, Mich., a corporation of Delaware No Drawing. Application May 26, 1950, Serial No. 164,614

1 Claim. (Cl. 260—653)

This invention relates to the preparation of 1,1,3-trichloro-3,3-difluoropropene.

1,1,3-trichloro-3,3-difluoropropene is a chemical compound not known prior to my invention; this material is differentiated from related previously known compounds by its unexpected utility as an extremely effective fumigant. Its physical characteristics, e. g., high volatility, make its use as a space fumigant or as a package fumigant particularly advantageous. The killing power of the compound is entirely unexpected.

The compound of the invention is conveniently prepared by dehydrochlorination of 1,1,1,3-tetrachloro-3,3-difluoropropane. The dehydrochlorination is conveniently effected in an aqueous medium by contacting the starting material with an alkali metal hydroxide. Since the dehydrochlorination is highly exothermic, the substituted propane is usually placed in a reactor, and the alkali metal hydroxide, dissolved in water, is added thereto to avoid an unduly violent reaction. It is helpful to reflux the mixture remaining after addition of the alkali metal hydroxide in order to assure complete reaction. Ordinarily, it is desired to use an excess (e. g., from 10 to 50 per cent) of the alkali metal hydroxide to effect dehydrochlorination.

The following example illustrates the preparation of 1,1,3-trichloro-3,3-difluoropropene, and the use thereof as a fumigant, but is not to be construed as limiting the invention:

Example 1,1,1,3 - tetrachloro - 3,3 - difluoropropane (134 grams) was placed in a flask fitted with a reflux condenser, and heated to reflux. Aqueous potassium hydroxide (56 grams in 100 cc. of water) was then added dropwise to the stirred substituted propane in the flask. The rate of addition was controlled to avoid violent refluxing; when the addition was complete, the reaction mixture was refluxed for about eight hours. The organic layer in the flask was then separated, washed with water and dried over anhydrous calcium chloride. Fractionation of the dried organic material yielded 51 grams of recovered starting material, and 27 grams of 1,1,3-trichloro-3,3-difluoropropene, which has the following physical properties: boiling point 94.8° C. at 743 mm. Hg; $n_D^{25°}$ 1.4190; density at 25° C. 1.5043 grams per cc.

1,1,3-trichloro-3,3-difluoropropene was tested as a fumigant by placing caged black carpet beetle larvae and confused flour beetle adults in a fumigation vault, and admitting a measured amount of the propene into the vault. The 1,1,3-trichloro-3,3-difluoropropene, in concentrations as low as 1.0 pound per 1000 cubic feet, was 100 per cent effective against the two species after 16 hour exposures; following exposure the beetles were in a normal atmosphere, and examination was made fourteen days after exposure. When the concentration was 0.5 pound per 1000 cubic feet, the compound was 100 per cent effective against the black carpet beetles, but only 50 per cent effective against the confused flour beetles.

I claim:

1,1,3-trichloro-3,3-difluoropropene.

ROBERT P. RUH.

REFERENCES CITED

The following references are of record in the file of this patent:

UNITED STATES PATENTS

| Number | Name | Date |
|---|---|---|
| 2,344,061 | Renoll | Mar. 14, 1944 |
| 2,404,706 | Harmon | July 23, 1946 |